United States Patent [19]
McKeever et al.

[11] Patent Number: 5,962,857
[45] Date of Patent: Oct. 5, 1999

[54] METHOD FOR THE FAST DETERMINATION OF AN UNKNOWN ABSORBED DOSE OF RADIATION WITH HIGH SENSITIVITY USING OPTICALLY STIMULATED LUMINESCENCE

[75] Inventors: Stephen W. S. McKeever; Mark S. Akselrod, both of Stillwater, Okla.; Brian G. Markey, Park Forest, Ill.

[73] Assignee: The Board of Regents for Oklahoma State University, Stillwater, Okla.

[21] Appl. No.: 08/879,385

[22] Filed: Jun. 20, 1997

Related U.S. Application Data

[63] Continuation-in-part of application No. 08/710,780, Sep. 20, 1996
[60] Provisional application No. 60/004,140, Sep. 22, 1995.
[51] Int. Cl.$^6$ .................................................. G01T 1/105
[52] U.S. Cl. .......................................................... 250/484.5
[58] Field of Search ........................................... 250/484.5

[56] References Cited

U.S. PATENT DOCUMENTS

| | | |
|---|---|---|
| 3,412,248 | 11/1968 | Kastner et al. ............... 250/336.1 |
| 4,507,562 | 3/1985 | Gasiot et al. . |
| 4,517,463 | 5/1985 | Gasiot et al. . |
| 4,638,163 | 1/1987 | Braunlich et al. . |
| 4,839,518 | 6/1989 | Braunlich et al. . |
| 4,906,848 | 3/1990 | Braunlich et al. . |
| 4,954,707 | 9/1990 | Miller et al. . |
| 4,999,504 | 3/1991 | Braunlich et al. . |
| 5,025,159 | 6/1991 | Miller et al. . |
| 5,041,734 | 8/1991 | Tetzlaff et al. . |
| 5,081,363 | 1/1992 | Tetzlaff et al. . |
| 5,091,653 | 2/1992 | Creager et al. . |
| 5,136,163 | 8/1992 | Miller et al. . |
| 5,196,704 | 3/1993 | Miller . |
| 5,272,348 | 12/1993 | Miller . |
| 5,354,997 | 10/1994 | Miller . |
| 5,567,948 | 10/1996 | Miller . |
| 5,569,927 | 10/1996 | Miller . |

FOREIGN PATENT DOCUMENTS

| | | | |
|---|---|---|---|
| 1668960 (A1) | 8/1991 | U.S.S.R. ......................... | 250/484.5 |
| 92/18880 | 10/1992 | WIPO . | |

OTHER PUBLICATIONS

"Pulsed Optically–Stimulated Luminescence Dosimetry using α–$Al_2O_3$:C, " S.W.S. McKeever, J.S. Akselrod, and B.G. Marley, 11$^{th}$ International Conference on Solid State Dosimetry, presented at Hotel Helia Conference, Budapest, Hungary, Jul. 10–14, 1996.

Time–Resolved Optically Stimulated Luminescence From α:$Al_2O_3$:C, B. G. Markey, L. E. Colyott, and S.W.S. McKeever, *Radiation Measurements*, vol. 00, No. 00, pp. 1–7, presented at International Symposium "LUMDETR '94", Sep. 25–29, 1994, Tallinn, Estonia.

M. Thoms et al., Spatial Correlation and Photostimulability of Defect Centers in the X–ray Storage Phosphor BaF-Br:$Eu^{2+}$Nov. 1991; Physical Review B vol.44, No. 17 pp. 9240–9247.

Bratslavets,P.et al., "Some Physical Processes in Photo-stimulated Activated . . . " Proceedings of the International Congress of Photographic Science 1990 (ICPS'90), Oct. 15–19, 1990, Beijing, China, 1990, The Advancement of Imaging Science and Technology, International Academic Publishers, pp. 474–476.

Thoms, M. et al., Optical and Thermal Properties of Electron–and Hole–Trapping Sites in the X–ray Storage Phosphor Rbl:X(X=$Tl^+$,$In^+$,$Pb^{2+}$,$Eu^{2+}$), (1994) pp. 1800–1808. J. Appl. Physics v76n3 Aug.

Rhyner, C.R., Miller, W.G. Radiation Dosimetry by Optically–Stimulated Luminescence of BeO *Health Physics* vol. 18 (Jun.), pp. 681–684.

*Primary Examiner*—Constantine Hannaher
*Attorney, Agent, or Firm*—Fellers, Snider, Blankenship, Bailey & Tippens, P.C.

[57] ABSTRACT

The optically stimulated luminescence generated from a luminescent material having a relatively long lifetime of luminescence is measured by using short pulses of laser light stimulation and detecting luminescence only between pulses of light stimulation and after a certain delay following the stimulation pulse.

13 Claims, 6 Drawing Sheets

METHOD FOR THE FAST DETERMINATION OF AN UNKNOWN ABSORBED DOSE OF RADIATION WITH HIGH SENSITIVITY USING OPTICALLY STIMULATED LUMINESCENCE

CROSS REFERENCE TO RELATED APPLICATION

This application is a continuation-in-part of copending U.S. application Ser. No. 08/710,780, filed Sep. 20, 1996, which application claims the benefit of U.S. provisional application Ser. No. 60/004,140, filed on Sep. 22, 1995.

STATEMENT REGARDING FEDERALLY SPONSORED RESEARCH

The invention described in copending U.S. application Ser. No. 08/710,780 was partially supported through a grant from the National Science Foundation, grant #EHR-9108771. No part of the additional subject matter described in this continuation-in-part was funded by federal grants or contracts. The government may have rights in this invention.

REFERENCE TO MICROFICHE APPENDIX

Not applicable.

BACKGROUND OF THE INVENTION

1. Technical Field

This invention relates generally to luminescence techniques for radiation dosimetry, and, more specifically, to determining rapidly an unknown dose of radiation through optically stimulated luminescence.

2. Background

Luminescence techniques in radiation dosimetry are currently dominated by the method of thermoluminescence (TL) in which a sample (a thermoluminescence dosimeter, or TLD) is exposed to a certain dose of radiation and is then heated in the dark. At a certain temperature, or in a certain temperature range (either of which is dependent upon the material used and the detailed parameters of the heating procedure), luminescence is emitted from the material. The intensity (for example, the integrated light emission between two specified temperatures) is related, by calibration procedures, to the original absorbed dose of radiation. In this way, a method of radiation dosimetry is possible. This method of radiation dosimetry has been described in the literature, and has been in general usage, for approximately four decades. (See McKeever et al.[1] for references to the early literature, and a summary of the state-of-the-art.)

As an alternative to thermal stimulation of the radiation-induced luminescence signal, optical stimulation is possible. Optically stimulated luminescence (OSL) was perhaps first suggested as a potential radiation dosimetry tool in 1955 by Antonov-Romanovskii[2] who suggested using infra-red light to stimulate luminescence from irradiated strontium sulfide. Later similar reports were presented by Braiunlich et al.[3] and Sanborn and Beard[4]. In each of these works the infra-red stimulated luminescence was continuously monitored during the light exposure—such a measurement mode is commonly referred to as "cw", or continuous wave, measurement—and the total luminescence detected was related to the initial absorbed dose. However, the sulfide materials used by these early investigators, and by more recent investigators[5], suffered from thermal instability and a high effective atomic number with an unacceptable energy dependence. Consequently, the use of IR-stimulated OSL from sulfides in dosimetry has not become established.

Several groups worked with wider band gap materials with acceptable effective atomic numbers and used light to transfer charge from deep traps to shallow traps, and then they monitored the phosphorescence decay from the irradiated materials. For example, in 1970 Rhyner and Miller[6] exposed samples of beryllium oxide to radiation, and subjected the irradiated materials to visible light for a specified period of time (up to 15 s). After a >2 s delay following the light exposure the luminescence from the sample is monitored for a preset time (up to 120 s). An essentially identical procedure was described for measuring OSL from $CaF_2$:Mn by Bernhardt and Herforth[7] in 1974, and later by Henniger et al.[8] in 1982. Berhardt and Herforth measured the intensity of the OSL emission 30 seconds after the end of the optical stimulation period (typically, 6 seconds long). Henniger et al., on the other hand, preferred to wait 10 s after the stimulation before measuring the integrated OSL between 10 s and 20 s. In each case a single light stimulation period was used. A very similar procedure is described by Pradhan and colleagues for monitoring OSL from $CaSO_4$:$Dy^{(9-11)}$. The latter authors used a 1 minute light stimulation and a 1 minute delay between the end of the excitation and the start of the measurement of the luminescence emissions.

An important aspect of the latter developments is that the delays between the end of the stimulation and the start of the measurement were purposely made long enough to exclude prompt OSL from the measurement and only to include that component of the OSL which is delayed by the action of trapping states (to be described later); indeed, this stipulation is specifically addressed in the papers by several of the authors. This method of OSL measurement, wherein there is a sufficient delay that prompt, or rapid, OSL emission is discriminated against by selection of a suitable time delay, is also known as "Delayed OSL" (or DOSL). To emphasize the fact that these authors are not using the prompt luminescence, but, rather, describe methods designed to monitor the delayed luminescence, the method is also called "optically stimulated phosphorescence".[7] Also note that in all of the above methods only one stimulation period is used in any one measurement. Furthermore, an important feature is that the length of the stimulation period, the length of the delay period (between stimulation and measurement), and the length of the measurement period are each significantly (orders of magnitude) longer than the lifetime of prompt OSL emission from the material.

Another similar technique is referred to as Cooled Optically Stimulated Luminescence (COSL).[12] Here the transfer of the charge from deep traps to shallow traps takes place at low temperatures (below room temperature) at which the transferred charge is stable in the shallow traps. The sample is then warmed to room temperature and during warming thermoluminescence emission is observed. The technique is, in fact, incorrectly described as an "optically stimulated" technique, and the older term for this process, phototransferred thermoluminescence (PTTL)[13] is more accurate.

Several patents exist on the use of the above techniques for measuring absorbed radiation dose, including those by Gasiot et al.[14] and Miller et al.[15,16].

A development which emerged in the mid-1980s was the application of OSL in archaeological and geological dating. Here the goal is to determine the radiation dose absorbed by natural materials (archaeological or geological artifacts) while exposed to natural background radiation during burial over 100s–1000s of years. This application so was first described by Huntley et al.[17] and involves the monitoring of the OSL emission simultaneous with the light stimulation. As with the IR-stimulated luminescence described above, the stimulating light is kept on the sample until the OSL signal has decayed to below the level of detection—i.e. the method of use is the cw-mode. This measurement mode is used within the dating community. Since the measurement of the luminescence is made simultaneously with the light stimulation, heavy filtering is required to discriminate between the stimulation light and the luminescence. Generally, these are of different wavelengths and one or other can be eliminated by the appropriate choice of optical filters. A second potential problem is the simultaneous stimulation of luminescence from non-radiation-induced defects within the sample which is also detected during measurement.

Another similar technology is called radiophotoluminescence (or RPL) in which a glass dosimeter is irradiated and then exposed to a fast (4 ns) laser pulse.[18-21] The luminescence (RPL) following the end of the laser pulse is monitored. The radiation creates defects within the glass host and the laser light excites these into an excited energy state, from which relaxation back to the ground state results in the emission of luminescence. However, unlike the present invention, or any of the above-mentioned techniques, the laser light is not intended to empty electrons from radiation-induced trapping states, but merely to excite radiation-induced defects into higher, excited energy states from where relaxation to ground, or original, energy states can take place. After the laser stimulation the number of radiation-induced defects remains the same in the RPL method since transfer of electrons from one defect to another does not take place. A similar technique was reported earlier by Regulla[22], using LiF instead of phosphate glasses. Recent patents describe this technology using LiF.[23,24]

Note should also be taken of laser heated thermoluminescence in which an irradiated sample is subjected to an intense infra-red beam from a $CO_2$ laser. The sample (and/or the substrate to which the sample is attached) absorbs the IR light and is heated. The heating induces the emission of thermoluminescence. Several publications and patents exist describing this technology.[25-30] The purpose of the laser light is to heat the sample, and in this way this technology differs substantially from the current invention.

References 1–30 listed in the following bibliography are incorporated by reference herein.

The current invention describes a method which measures the OSL emission in neither of the above two modes (i.e. neither DOSL, nor cw-OSL). The disadvantages of the above measurements modes are that only a small fraction of the OSL emission is delayed by the action of traps and thus DOSL is only capable of measuring this small component. In the cw-OSL method the heavy filtering which is required inevitably means that a substantial portion of the luminescence is also filtered and, therefore, is lost to the measurement. An additional disadvantage of both procedures is that the measurement process is extremely slow, taking place over several seconds, or tens of seconds (typically, up to 100 s).

This invention describes a method in which we discriminate against both the cw-OSL emission and DOSL emission, and instead monitor only that prompt OSL which emerges immediately after the cessation of the stimulation pulse (after a very short delay to allow the detection electronics to relax). The measurement mode to be described results in a significant enhancement of detected OSL signal and leads to a sensitive tool for the measurement of very small absorbed radiation doses. It is the intent of this invention to achieve fast measurements with high sensitivity over a wide dynamic range of radiation doses without encountering significant background signal interference or stimulation light leakage. The invented measurement mode is termed Pulsed-OSL (or POSL).

SUMMARY OF THE INVENTION

The present invention encompasses measuring the OSL generated from a luminescent material having a relatively long-lived "prompt" luminescence (i.e. microseconds to tens of milliseconds). The OSL is stimulated using a continuous stream of short (i.e. less than the prompt luminescence lifetime) pulses of laser light, and the integrated OSL is measured only between pulses within the stream, with a certain delay after each stimulation pulse. A key element is the choice of a laser pulse width which is significantly shorter than the lifetime of the prompt OSL emission from the material.

High efficiency and fast luminescence measurements of radiation dose over a wide-dynamic range, and with a large signal-to-noise ratio, are achieved by:

(a) quickly reaching a high population of excited state luminescence centers in an irradiated detector material using intense stimulation pulses from a laser, flashlamp, or light-emitting diode;

(b) keeping this high population of excited states for a long-enough time to allow a photodetector (particularly a photomultiplier tube, PMT) to relax after each light stimulation pulse;

(c) measuring the integrated OSL (induced by the initial radiation) between illumination pulses with high efficiency—defined as a high luminescence yield with a low background signal and a small loss of luminescence signal during the stimulation pulse itself and during the photodetector relaxation time; and (d) adjusting the stimulation light (e.g. laser) power and the total number of illumination pulses to perform dose measurements over a dynamic range of at least seven (7) orders of magnitude, and to prevent the saturation of the detector or photon counting system, and to prevent the generation of background luminescence due to non-radiation-induced multiphoton processes within the sample.

The method involves illuminating the irradiated material with ultraviolet or visible light of variable wavelength in the wavelength range 250 nm to 1100 mn, and detecting the luminescence which is emitted from the material. The OSL emission may be of variable wavelength, in the wavelength range 250 nn to 1100 mn. The illuminating light is continuously pulsed, with pulse widths ranging from as low as 1 ns, but in all cases with pulse widths significantly less than the characteristic lifetime of the prompt luminescence emission. The emission is monitored by integrating the OSL signal over the period between a delay after each pulse, and before the next pulse. Each integrated luminescence signal is summed and the sum is related to the initial absorbed dose of radiation, and thus may be used to calculate the unknown dose after calibration.

The preferred method is bimodal in nature. An irradiated sample of a luminescent material is mounted in the path of an illumination beam. The sample has a plurality of lattice defects and impurities which act as traps and luminescent centers. The lifetime of the luminescent centers (also referred to as "prompt" luminescence in this invention) is equal to or longer than the light pulse duration plus the delay needed for the photodetector to relax after the intense stimulation pulse. Furthermore, the sample has a radiation-induced absorption band within a wavelength range which overlaps with that of the illumination beam. The absorption is caused by the localization of electronic charge species (electrons or holes) at pre-existing, or radiation-created, defects within the lattice. During light absorption, the charge carriers are released from the traps by optical stimulation and become available to undergo recombination, with the subsequent emission of light. The traps of interest in this application are called "dosimetric traps".

An important aspect of this invention is that fact that the illumination beam is pulsed for a period of time that is smaller than the lifetime of the luminescence centers. A succession, or train, of pulses is incident on the sample for a pre-determined period. It is important that the photon flux (photons/s/cm$^2$) of the illumination beam be insufficient to heat the luminescent material to or above a temperature that causes thermal quenching A of the luminescence efficiency, nor above that which would cause significant thermal release of the charge from the dosimetric traps (so producing thermoluminescence from the material). It is also important that the wavelength of the illuminating beam be close to the wavelength of the maximum efficiency for optical release of the charges from the dosimetric trap. Furthermore, it is important that the combination of illumination (laser) power and wavelength be such that the illuminating beam is unable to produce photoionization of non-radiation-induced defects thereby producing a luminescence signal from the unirradiated material.

A luminescence emission from the sample is then detected with a photodetector in the period of time between a certain time delay following the end of one illumination pulse and the start of the next pulse. The photon counts detected during each of these periods are summed to form the total luminescence signal, which is then related to the original absorbed radiation dose by calibration of the system against a known absorbed dose. The luminescence signal is of a wavelength which is different from that of the illuminating light. The time delay after each pulse serves to allow the photodetector to relax after each stimulating pulse.

In a first mode, the sample is completely detrapped—that is, all (or almost all) the charge trapped at the dosimetric traps is removed by optical stimulation from the illuminating beam. The number of illuminating pulses, each being followed by a time delay and a period over which the luminescence counts are detected, and the total illumination light energy are selected such as to completely, or almost completely, extract all radiation-induced luminescence from the material.

Absorbed dose re-estimation is possible when the system is operated in a second mode. In this mode the number of illumination pulses, each being followed by a time delay and a period over which the luminescence counts are detected, and the laser power and time of illumination are selected such that only a portion of the trapped charge is released from the dosimetric traps. The illumination light energy incident on the sample is precisely adjusted and determined so that two or more, independent, absorbed dose measurements may be made on the same sample after the same irradiation.

In either of the two modes, the luminescence signal is compared with calibrated luminescence signals recorded in the same way and attributable to known doses of irradiation in order that the unknown absorbed dose may be determined.

In one aspect of the preferred bimodal operation, two or more pulsed illumination beams having different wavelengths are incident on the sample to stimulate two or more sets of different dosimetric traps, having different optical stimulation energies, and, therefore, different wavelengths for maximum stimulation efficiency.

In another aspect of the preferred bimodal operation, the intensity of the illumination beam is adjusted commensurate with the dose range being studied in order to achieve a dynamic range of absorbed dose of at least seven (7) orders of magnitude.

In yet another aspect of the preferred bimodal operation, two beams, of the same wavelength but differing in illumination (e.g. laser) power by one (1) or two (2) orders of magnitude, are available for use. The sample is first exposed to the weaker of the two beams in a preliminary illumination and the initial luminescence signal from this illumination is used to determine the dose range being examined. The sample is than subjected to a second, normal exposure, with either the weaker or the stronger of the two beams, as dictated and determined from the results of the preliminary weak beam exposure. In a preferred aspect, the weakest of the illumination beams is at least ten (10) times smaller than that of the stronger of the illumination beams.

One aspect of the invention is a method to determine the absorbed radiation dose in aluminum-oxide-based materials—i.e. aluminum oxide with oxygen vacancies and additional elements in solid solution—and is based on the observation of OSL from this material following exposure to ionizing radiation. It is important to note that use of a bi-element material—e.g. aluminum oxide alone—is not a part of the claim of this invention. The invention only concerns multi-element materials—e.g. aluminum oxide with a third or more elements (e.g. carbon) in solid solution with the aluminum oxide. Such a form of aluminum oxide, grown in a reducing atmosphere so as to induce the formation of large numbers of oxygen vacancy centers, possesses high sensitivity (i.e. it produces a large OSL signal for a small dose of absorbed radiation). Oxygen vacancies with two trapped electrons (so-called F-centers) or with one trapped electron (so-called F$^+$-centers) act as luminescence sensitizers and are important to the use of this material as an OSL dosimeter.

A better understanding of the invention and its objects and advantages will become apparent to those skilled in this art from the following detailed description, taken in conjunction with the attached drawings, wherein there is shown and described only the preferred embodiment of the invention, simply by way of illustration of the best mode contemplated for carrying out the invention. As will be realized, the invention is capable of modification in various obvious respects, all without departing from the invention. Accordingly, the description should be regarded as illustrative in nature and not restrictive.

DETAILED DESCRIPTION OF THE PREFERRED EMBODIMENT

Before explaining the present invention in detail, it is important to understand that the invention is not limited in its application of the details of the construction and the steps illustrated herein. The invention is capable of other embodiments and of being practiced or carried out in a variety of ways. It is to be understood that the phraseology and terminology employed herein is for the purpose of description and not of limitation.

In general, an irradiated sample of an acceptable material is mounted in the path of a beam of ultraviolet or visible light (the illumination beam). The illumination beam is pulsed, with pulse widths smaller than the lifetime of the prompt luminescence from the material. The light emission is detected between pulses and the total luminescence emitted is the sum of the detected luminescence between each pulse. The unknown radiation dose is then determined from a calibration of the emitted luminescence against known doses of radiation.

Figure 1:
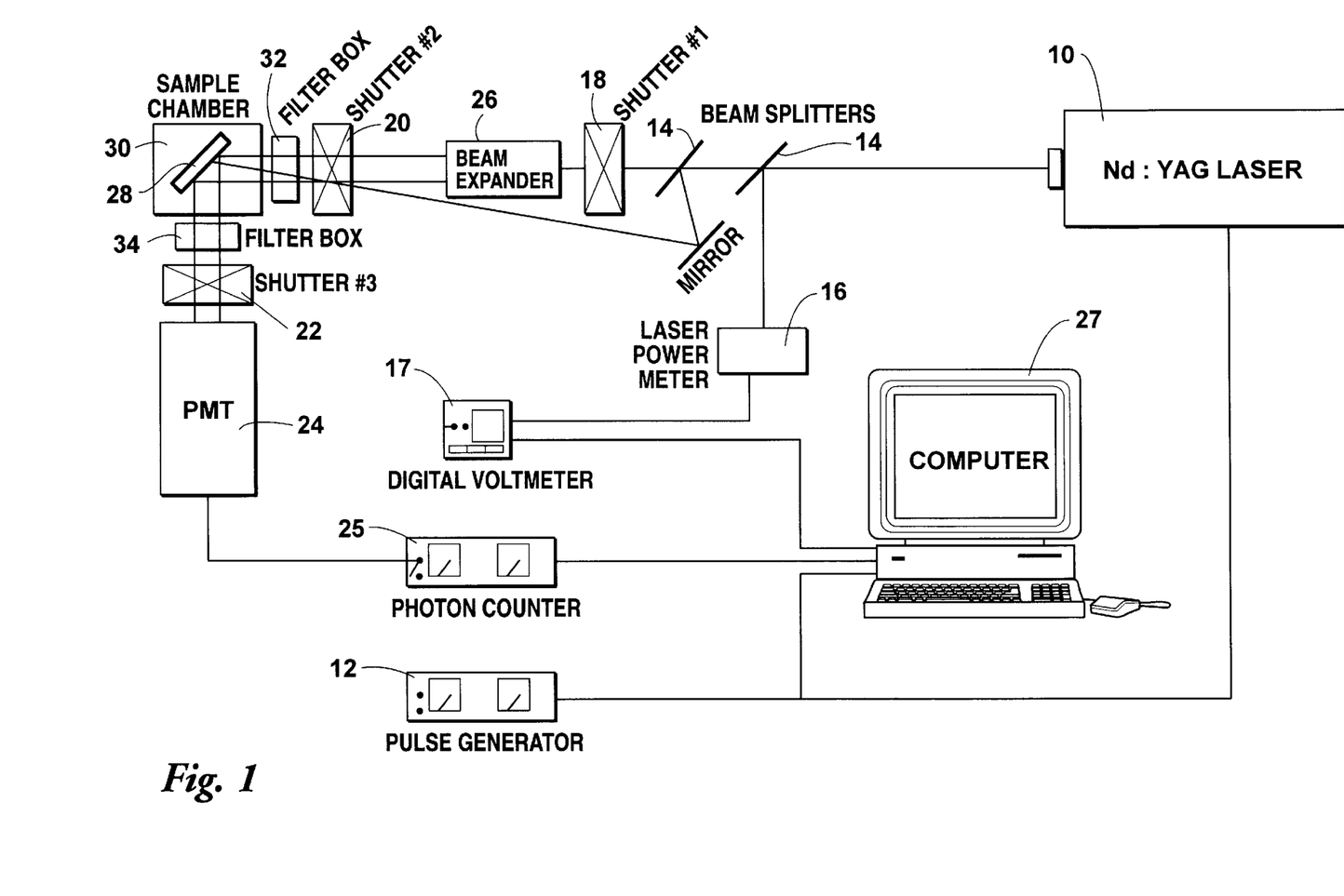
FIG. 1 is a schematic of the preferred Pulsed-OSL (POSL) system.

A schematic of the apparatus for the preferred embodiment is illustrated in FIG. 1. The illuminating light is a beam from a frequency-doubled, Nd:YAG laser 10 with an output at 532 nm controlled by a pulse generator 12. The number of illumination pulses may be controlled by means of an electronic shutter, mechanical shutter, beam polarizer or liquid crystal modulater. Pulse durations of 1–10,000 ns and repetition rates of 1–20,000 Hz are preferred. Beam splitters 14 are used to (a) continuously monitor the output power via a power meter 16 which is in communication with a digital voltmeter 17, and (b) to split the beam into "weak" and "strong" beams, both of which are incident on the sample, and either or both of which can be turned off by the use of shutters 18, 20 (shutters #1 and #2). The beams are split such that the power of the "weak" beam is approximately two (2) orders of magnitude less than that of the "strong" beam. Shutter #3 22 is used to protect a light detection device from external light entering the sample chamber. The luminescence emission from the sample is preferably detected by a bi-alkali photomultiplier tube 24. The photon counts from the tube, counted in the periods following each laser pulse by photon counter 25, are summed over the total number of pulses and form the measured luminescence signal. A beam expander 26 serves to illuminate the sample uniformly. The pulse generator 12, digital voltmeter 17 and photon counter 25 are commanded and controlled by computer 27 as is well known in the art.

The illumination beam(s) is directed at an irradiated sample 28 located in a sample chamber 30. The measurements are made using "reflection" geometry (i.e. the luminescence is read from the same side as the illumination). Two filter packs 32, 34 (the first a 515 nm cut-off filter, and the second a combination of a 532 nm laser line reflecting notch filter and a 420 nm band pass filter) are used to help separate the excitation light from the emission light.

Figure 2:
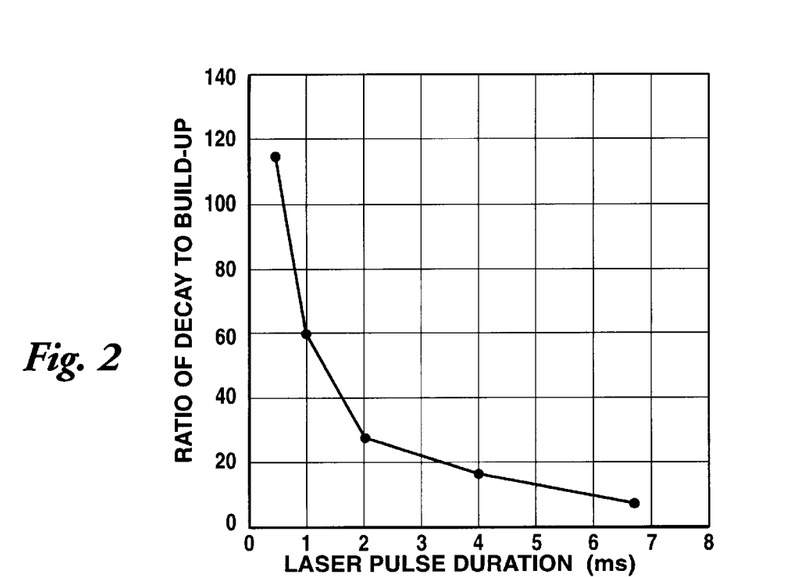
FIG. 2 is a graph of the efficiency of the POSL measurement as a function of the pulse width for constant average laser power. The data illustrated were taken with an average laser power of 237 mW. The efficiency is defined as the ratio of the light emitted after the pulse ("decay") to that emitted during the pulse ("build-up").

Selection of the preferred pulse widths and pulse frequency are best explained with reference to FIGS. 2 and 3. In FIG. 2 we show the ratio of the luminescence emitted after the pulse to the luminescence emitted during the pulse. In the present invention the luminescence is measured after the pulse and thus this luminescence component needs to be maximized with respect to the luminescence emitted during the pulse. FIG. 2 demonstrates that this can be done by reducing the pulse duration, while at the same time keeping the energy incident on the sample the same. The data illustrated here are typical only and are not meant to be definitive.

Figure 3A:
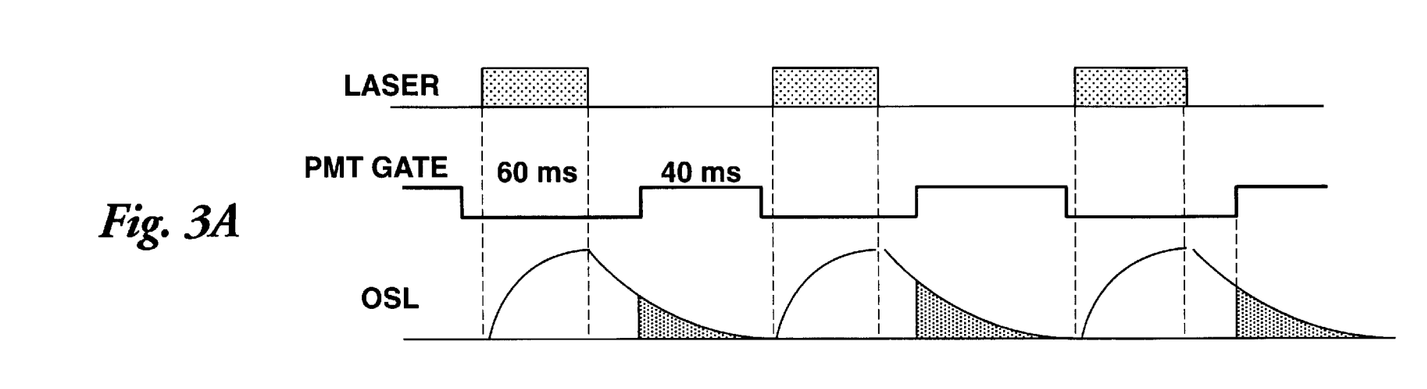
FIGS. 3A–3C are schematics of the possible timing diagrams for POSL measurement, showing two possible modes of operation (3A and 3B), and the preferred mode (3C).

FIG. 3 schematically illustrates three possible timing sequences for measuring OSL. In FIG. 3A one stimulates the sample with long, low power (e.g. 10 mW) pulses, at low frequency and allows the stimulated luminescence to decay entirely between each pulse before the next pulse is applied. In this connection "long" is defined as equal to, or greater than, the luminescence lifetime of the luminescence centers within the sample. Although in this type of measurement the luminescence monitored is made up of mainly the prompt luminescence (of lifetime equal to the luminescence lifetime of the emitting centers), this procedure leads to long reading times since the luminescence decays exponentially between the pulses of laser stimulation, and a low efficiency since a significant amount of luminescence is lost during the illumination.

Figure 3B:
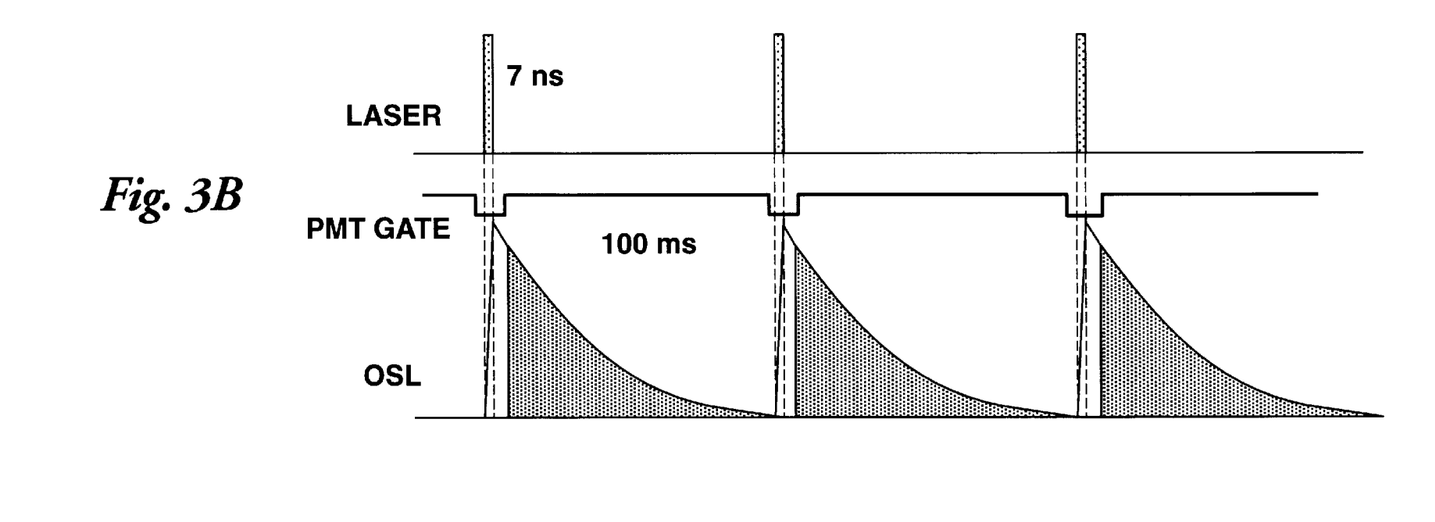

In FIG. 3B one uses short, high peak power (e.g. $10^7$ W) pulses at low frequency. Again the luminescence is allowed to decay entirely between pulses but sensitivity is greater than in the measurement of FIG. 3A because proportionally more luminescence is emitted after the pulse than during the pulse—as the data of FIG. 2 shows. In this connection "short" pulses means that the pulse width is significantly less than the lifetime of the prompt luminescence from the luminescence centers. However, the disadvantage of using this scheme to stimulate and measure the OSL emission is that the high peak powers from the laser cause a strong background signal due to multiphoton absorption events. This is observed even in unirradiated samples and is not radiation-induced. Additional problems associated with the high laser powers are possible heating of the sample and "blinding" of the PMT.

Figure 3C:
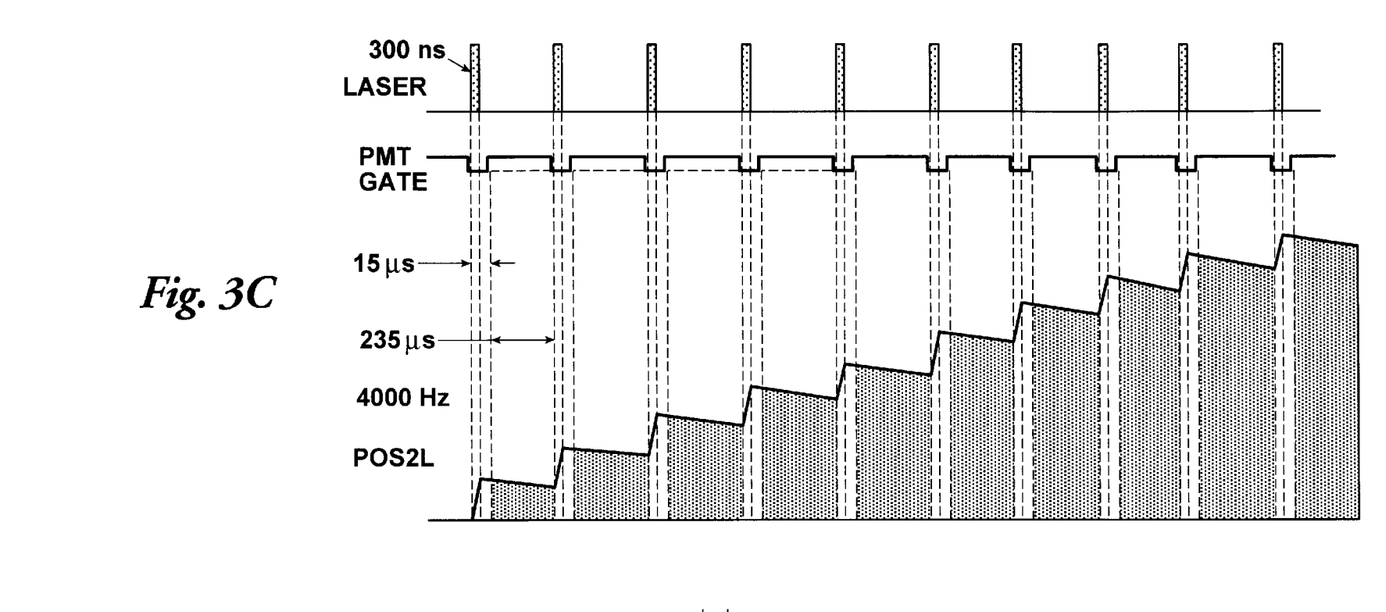

The procedure adopted in the present invention is shown in FIG. 3C. Here, a rapid (high frequency) train of short, low power light pulses is applied to the sample. The pulse width, the delay between the end of the pulse and the start of the measurement, and the period of luminescence measurement between pulses are all "short"—i.e. they are all less than the prompt luminescence lifetime. Since not all of the luminescence has decayed in the period between pulses, the luminescence monitored between successive pulses increases until such time as an equilibrium is reached between luminescence center excitation and luminescence center relaxation or until the concentration of charge in the "dosimetric traps" is depleted, at which point the luminescence between pulses is observed to decrease. The final signal measured is the sum of all the integrated luminescence measured between each pulse, summed over all pulses. The advantages of this measurement procedure over previously suggested procedures are:

Only a very small fraction of the luminescence is emitted during the pulse and delay periods. Most of the emitted luminescence emerges between pulses, and this is all collected. This results in a very high sensitivity over all previously suggested OSL procedures.

Luminescence caused by non-radiation-induced multiphoton absorption processes is avoided by limiting the laser power density on the sample during stimulation, thereby increasing the signal-to-noise ratio. Additional problems associated with heating of the sample and "blinding" of the PMT are also avoided.

By either gating the photodetector off, or by gating the data acquisition electronics off, during laser stimulation one avoids the measurement of the luminescence during the pulse and, thereby, eliminates problems due to the discrimination between the excitation light and the luminescence light. Furthermore, fast luminescence processes (of lifetimes less than the pulse width and the delay time) are not measured. This again results in an increased signal-to-noise ratio.

The duration of the stimulation, the pulse frequency and the laser energy per pulse can all be adjusted, within the limitations described above, so that almost all, or only a fraction, of the charge in the dosimetric traps may be depleted. This in turn allows the operation of the procedure in either of the two measurements modes already described, providing a method to re-read the absorbed dose information. Experimentally determined correction factors may be used to correct the luminescence light for the number of times the dose re-estimation was previously performed from the same sample and for the same irradiation.

Additionally, the duration of the stimulation, the laser pulse frequency and the laser energy per pulse can all be adjusted, within the limitations described above, so that a wide dynamic range of dose measurement can be achieved, over seven (7) orders of magnitude.

By use of different wavelengths of the stimulation light one can empty trapped charge from different dosimetric traps available in the sample. Thus, by using wavelength $\lambda_1$ one may empty the charge from one set of dosimetric traps. A subsequent second illumination at a different wavelength $\lambda_2$ will result in the ability to empty the charge from a second set of different, dosimetric traps. Each signal may be calibrated and individually used to calculate the absorbed dose. A second method to re-read the sample is accordingly provided.

Hereinbelow, the low-dose capabilities and the wide dynamic range of the invention is demonstrated by reference to particular examples. The flexibility of the technique and its potential in dosimetry applications is accordingly discussed.

EXAMPLE EXPERIMENTS

The example experiments described below are meant to be illustrative of the procedures described above and should not be construed to be definitive descriptions of experimental procedures.

Anion-deficient aluminum oxide, with carbon in solid solution, was chosen for the experiments. The luminescence center active in OSL in this material is an oxygen vacancy trapping two electrons. The crystalline anion-deficient aluminum oxide with a third element, or elements in solid solution, has an F-center concentration of $10^{16}$–$10^{18}$ cm$^{-3}$, corresponding to an absorption coefficient of 1–100 cm$^{-1}$ at 205 nm, and an F$^+$-center concentration of $10^{15}$–$10^{17}$ cm$^{-3}$, corresponding to an absorption coefficient of 0.1–10 cm$^{-1}$ at 225 nm. The lifetime of the prompt luminescence from the F-centers is approximately 35–36 ms. The luminescence is a broad band peaking at approximately 420 nm. The maximum efficiency of OSL excitation occurs at an excitation wavelength of approximately 450–470 nm.

The stimulation source used in the experiments was a Nd:YAG laser operated in the second-harmonic. The wavelength of the laser light was 532 nm. The parameters chosen for the experiments were a laser pulse frequency of 4,000 Hz and a total stimulation duration of 1 s (i.e. 4,000 laser pulses). The laser pulse width was 300 ns. The energy per pulse did not exceed 1 mJ. The primary laser beam was first split in the ratio 4:1, with the weaker beam used for monitoring the laser power. The remaining beam was further split in the ratio 100:1 and both of these strong and the weak beams were separately focused onto the sample. The spatial laser beam profile on the sample was Gaussian.

The measurements were made in reflection geometry. Two filter packs (the first a 515 nm cut-off filter, and the second a combination of a 532 nm laser line reflecting notch filter and a 420 nm band pass filter) were used to separate the excitation light from the emission light.

Figure 7:
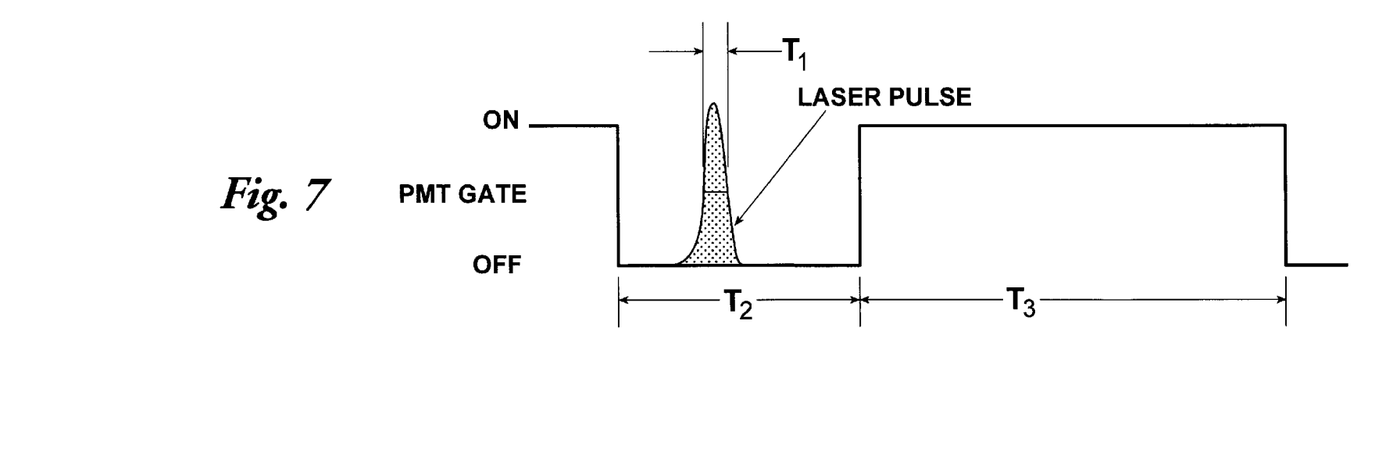
FIG. 7 shows the timing diagram and the detailed relationship between the PMT gate and the laser pulse, illustrating the pulse width $T_1$, the "dead" time $T_2$ and the acquisition time $T_3$.

The photodetector (a bi-alkali photomultiplier tube) was gated off for a total of 15 μs starting from before the initiation of the laser pulse (see FIG. 7). Using this arrangement background signals from unirradiated samples were kept very low.

Example I

Al$_2$O$_3$:C: Dose Response, Minimum Measurable Dose and Dynamic Range

Figure 4:
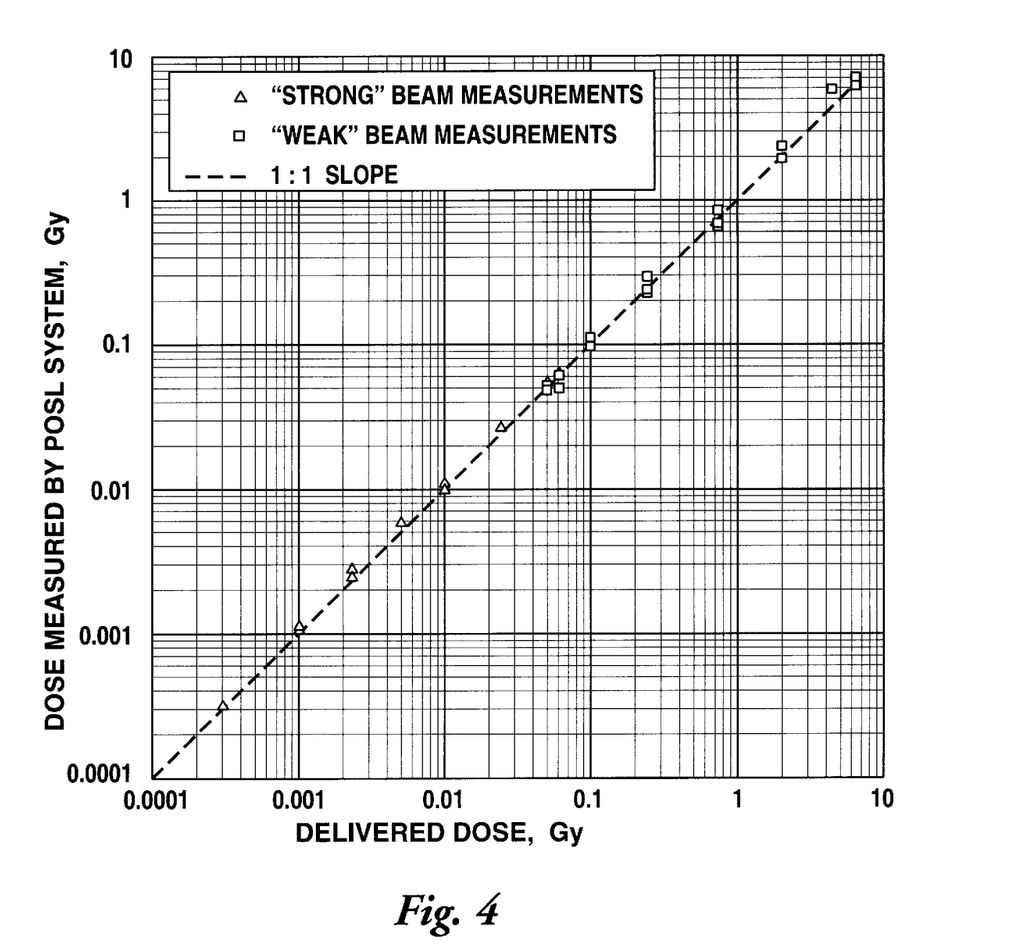
FIG. 4 shows the kinetics of the POSL and DOSL signals from three different forms of (tri-element) Al$_2$O$_3$:C single crystal.

FIG. 4 shows the POSL signal versus absorbed dose for a sample of Al$_2$O$_3$:C stimulated as described. The light output is the total integrated output summed over all 4,000 laser pulses for a stimulation period of 1 s. (Note that in this 1 s period the light was incident on the sample only for a total of 4000×300 ns=1.2 ms.) For doses of greater than 3×10$^{-2}$ Gy the "weak" beam (0.012 W of average power) was used in the measurement. For all other doses the "strong" beam (1.2 W of average power) was used. For the arrangement described the minimum measurable dose (defined as 3× the standard deviation of the background signal from an unirradiated sample) is 5×10$^{-7}$ Gy. Saturation of the POSL signal starts at approximately 10$^2$ Gy.

Example II

Dose Re-estimation

Figure 5:
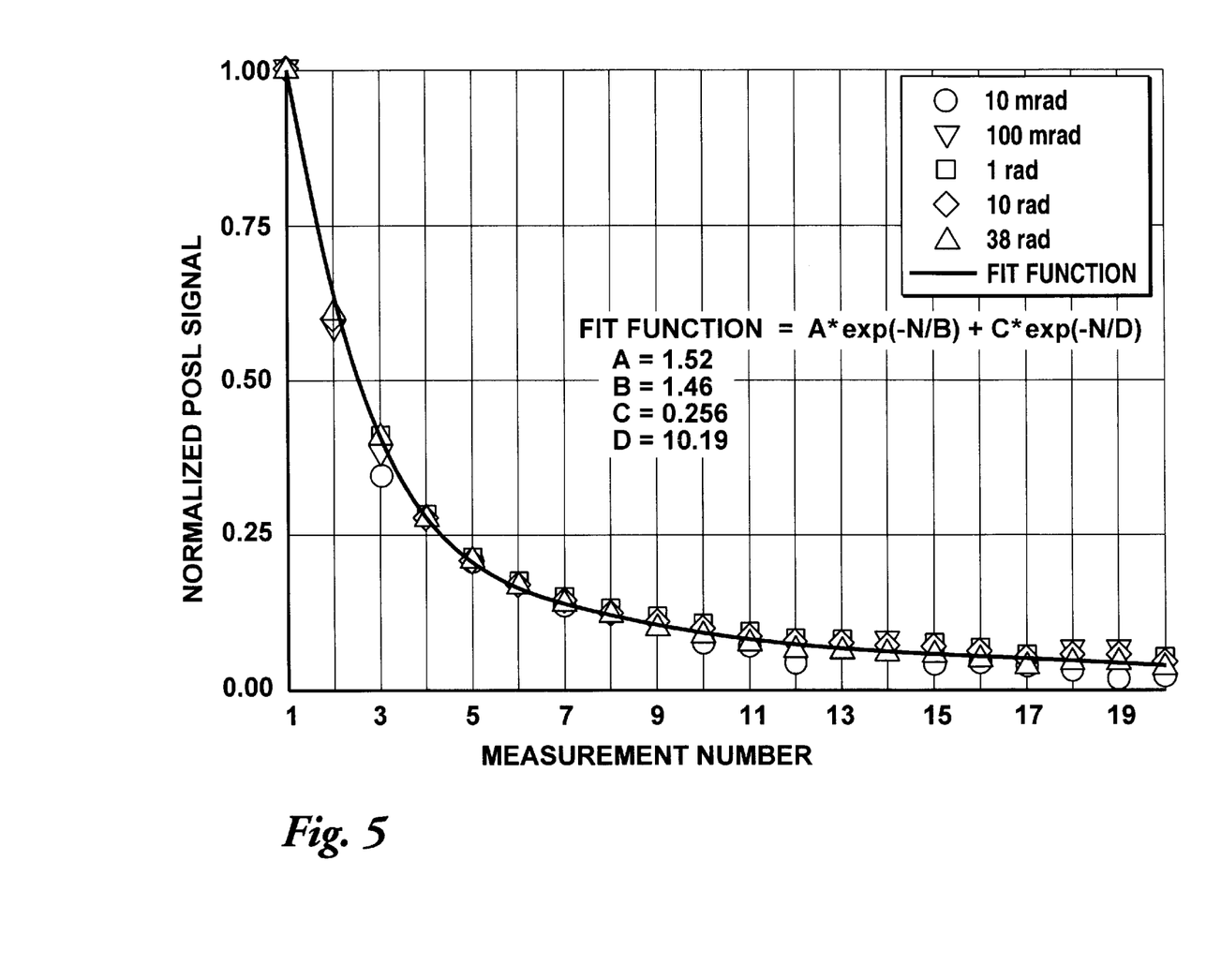
FIG. 5 is the dose response of a 4,000 Hz, 1 second POSL measurement, expressed as total POSL signal versus absorbed dose from a $^{90}$Sr source.

FIG. 5 shows the depletion of the POSL signal as a function of the number of measurements made for a set of different absorbed doses. Each measurement consists of 4,000 laser pulses administered over 1 s, as above. The data for different doses are normalized to give the same value for the first measurement. It is important to emphasize that the depletion rate for each dose is observed to be the same. For the average laser power chosen the depletion can be represented by the expression:

POSL=Aexp{-N/B}+Cexp{-N/D} with fitting constants A=1.52, B=1.46, C=0.256 and D=10.19. N is the number of the POSL measurement. Using this expression, the dose for the Nth measurement $D_N$ can be estimated from:

$D_N$=(POSL/E)/(Aexp{-N/B}+Cexp{-N/D})

where E is a calibration constant. It will be clear that the values of the constants A, B, C, D and E depend on the detailed configuration used for recording the data, including parameters such as laser power at the sample, time of illumination, etc. The example given here is illustrative only.

Example III

POSL and DOSL Comparisons

Figure 6:
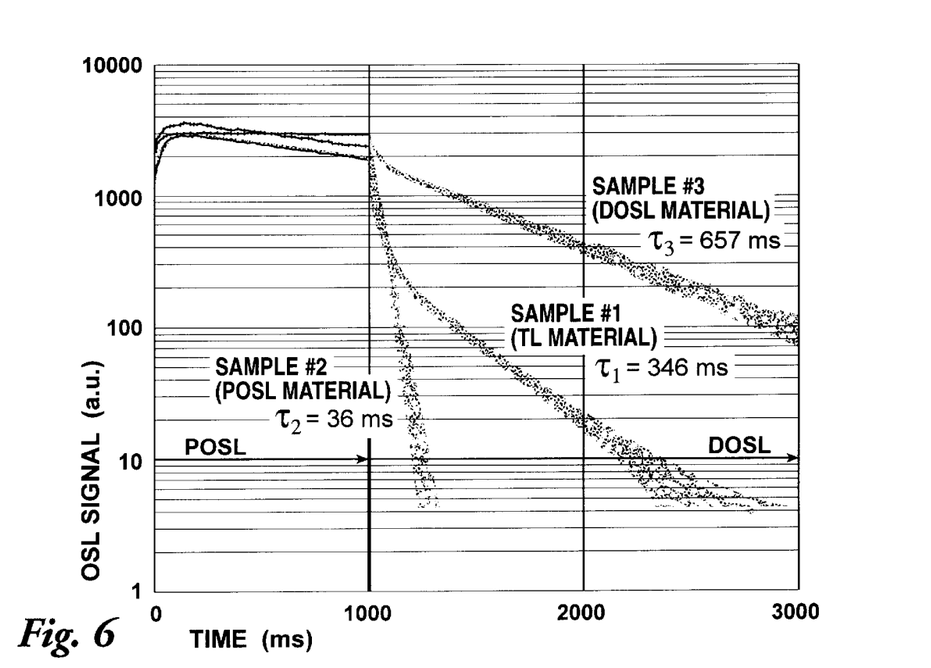
FIG. 6 shows the principle of dose re-estimation for a variety of absorbed doses. The figure shows the measured POSL signal in each of 20 separate measurements.

FIG. 6 shows an example data set of POSL and DOSL for three different types of Al$_2$O$_3$:C tri-element detectors. The laser light (4,000 pulses for 1 s) is applied to the irradiated sample at time zero, and the POSL signal is measured, in the manner already described, as a function of time. Following an initial build-up, the POSL signal either decays, or stays approximately constant, during the laser stimulation period. After the last laser pulse, however (i.e. at 1,000 ms) the luminescence is seen to decay, with time constants which vary from sample to sample. The fastest decay corresponds to a sample which does not have a significant concentration of shallow traps, and therefore one measures the lifetime of the "prompt" luminescence—in this case 35.6 ms. The other two samples both show a longer, slower decay after an initial rapid decrease. The slow decay is the result of photostimulated transfer into the shallow traps, followed by the slow thermal release of these charges and subsequent recombination. The observed decay constants reflect the energy distributions of the shallow traps, which is slightly different in the two cases. It is this slow decay which is monitored during "DOSL" measurement i.e. the optically stimulated phosphorescence described in earlier references.

The following should also be noted: (I) The POSL part of the signal is measured between the laser pulses, not during them. (II) The integrated POSL signal is many times larger than the integrated DOSL signal. (III) to completely measure all the available DOSL signal, one would have to monitor the decay for several seconds (approaching 10 s); thus, the POSL measurement is substantially faster than the DOSL measurement.

Example IV

Estimation of Parameters and Requirements Useful for POSL Measurement from $Al_2O_3$:C Several parameters and requirements were discovered in the course of developing the present invention for use with $Al_2O_3$:C. Once again we emphasize that these parameters are given here by way of illustrative example only and are not meant to be restrictive or definitive.

1. Peak Laser Power

Limitations of the peak laser power density are important because it was found that peak power densities which are too high can result in three undesirable processes which must be avoided since they will decrease the effective performance of the method.

(a) Two-photon absorption of the laser light in the luminescent material induces a background luminescence not related to the absorbed radiation dose. The following calculations illustrate the importance of this effect.

The effect was found with $Al_2O_3$:C tri-element detectors using the second harmonic of a Nd:YAG laser operated with a pulse width of 5 ns at 10 Hz. For an average laser power of 1.2 W a high background signal was measured equivalent to approximately 0.03 Gy of absorbed dose (using a beam area of 1 $cm^2$). We calculate the energy per pulse at this average power and frequency from:

energy per pulse=1.2/10=120 mJ and the peak power density, $P_1$, is:

$P_1$=120/5 mJ/ns/$cm^2$=2.4×$10^7$ W/$cm^2$.

Alternatively, a repetition rate of 1,000 to 10,000 Hz with a pulse width of 100–500 ns and an average energy per pulse of 0.1–1.0 mJ provides an example of a case where the power density on the sample is sufficiently low to prevent two-photon effects. For example, in the experiments described we chose a frequency of 4,000 Hz with the same average power (1.2 W). The energy per pulse is now:

energy per pulse=1.2/4,000=0.3 mJ With a laser pulse width of 300 ns the peak power density, $P_2$, is now:

$P_2$=0.3/300 mJ/ns/$cm^2$=$10^3$ W/$cm^2$.

Note that the average power imparted to the sample is the same (1.2 W) in the two cases. As a result, we decrease the peak laser power density by a factor of:

$P_1/P_2$=24,000.

Since the noise is caused by a two-photon process—i.e. a quadratic dependence upon peak power—this reduction in peak power decreases the noise by a factor of:

$(24,000)^2$=5.7×$10^8$ times.

This is equivalent to a background equivalent dose of <$10^{-7}$ Gy. Thus, we demonstrate the extreme importance of restricting the peak laser power to be as low as possible, while still maintaining a high enough sensitivity for low dose measurements. The parameters used in this example (frequency=4,000 Hz, pulse width=300 ns and energy per pulse=0.3 mJ) provide a case where this is achieved.

(b) Laser-Induced Heating of the luminescent material may occur if the laser power density is too high. This can result in a increase in local temperature, which in turn can lead to a loss of OSL signal caused by either thermal emptying of the trapped electrons, or by thermal quenching of the intrinsic luminescence efficiency, or by both. The power restrictions described in the preceding paragraph also serve to prevent problems due to heating of the sample.

(c) Photomultiplier Tube "Blinding" can be a problem such that, even with a power supply to the photomultiplier tube dynode chain gated (i.e. switched) off during the laser pulse, the photocathode material can be damaged (permanently or temporarily) if the light intensity is too high. The restrictions on laser power described above serve to prevent problems due to PMT "blinding".

2. Timing Considerations and the Lifetime of the Luminescence Centers

The timing is best described with reference to FIG. 7. Here the PMT is gated off a short time (the "delay" time) before the start of the laser pulse. The laser pulse itself has a full width at half maximum (also known as the pulse width) of $T_1$. The total "dead" time is defined as the time for which the PMT is gated off ($T_2$ in FIG. 7). Thus, we define the following parameters:

$T_1$—the laser pulse width $T_2$—the time the PMT is gated off, or the "dead" time $T_3$—the time the PMT is gated on, or the "acquisition" time τ—the lifetime of the luminescence centers Important requirements of this invention are that:

$T_1<T_2<\tau$

It is also desirable, but not restrictive, to use $T_3<\tau$

The reason for this being desirable is explained more fully below.

From experiments using a Xe flash-lamp it was experimentally determined that the relaxation time of the photodetector (a bi-alkali photomultiplier tube) after the light pulse is approximately 10 μs. To achieve a high efficiency of data acquisition the total "dead time" $T_2$ (during which time the luminescence is not measured and which needs to include both the laser stimulation pulse and the PMT relaxation) should not be longer than the luminescent lifetime of the luminescence centers. Neither should it be greater than the time between laser pulses. In our preliminary study we investigated different values of $T_1$, $T_2$ and $T_3$. For the final experiments with $Al_2O_3$:C we chose $T_1$=300 ns, $T_2=15$ $\mu$s, $T_3=235$ $\mu$s, and $T_2/T_2+T_3=0.06$, with a frequency of 4,000 Hz. The luminescence lifetime $\tau$ in $Al_2O_3$:C is approximately 35 ms and, thus, the criterion $T_1<T_2<\tau$ is satisfied. At 4,000 Hz the total dead time for a 1 s stimulation period is 4,000×15 $\mu$s=60 ms. The total acquisition time is thus 1000−60 ms=940 ms. Therefore, the useful time for data acquisition is 94% of the stimulation period. Since $T_3<<\tau$, the luminescence is approximately constant during the acquisition time and, thus, the luminescence measurement efficiency is also approximately 94%.

Although having $T_3<\tau$ is preferable, it is possible to use the invention with $T_3>\tau$. However, due to the exponential decay of luminescence between pulses of laser stimulation, the period of time between pulses $T_3$ need not be longer than approximately three (3) lifetimes $\tau$ of luminescence, since three lifetimes corresponds to 95% of the total light output between pulses and longer acquisition periods gain little. However, in order to get the same amount of energy imparted to the sample as in the above example, and bearing in mind the restriction regarding laser power, as also noted above, we would still require 4,000 laser pulses to be incident on the sample. Assuming approximately three (3) lifetimes between pulses (or approximately 105 ms) this would require a total stimulation period of approximately 4,000×105 ms=420 s. Thus, although this is possible, the advantage of the method outlined in the above example is that it reduces the stimulation period to 1 s while maintaining a 94% measurement efficiency.

3. Radiation-Induced Absorption

It is also necessary that the radiation-induced absorption in the material, within the wavelength range of the stimulation, be sufficiently high that a large stimulation efficiency is achieved, but not too high so that the light is unable to penetrate the whole of the sample. With this restriction in mind the wavelength of the laser stimulation should be as close to the maximum of the radiation-induced absorption as possible. In the case of anion-deficient, $Al_2O_3$:C tri-element detectors, a wide absorption band between 350 nm and 600 nm, with a maximum at about 470 nm, can be used for optical stimulation.

4. Photoionization

The wavelength of the stimulating light should also be chosen such that there is no photoionization of an unirradiated detector. For anion-deficient, $Al_2O_3$:C tri-element detectors photoionization occurs for stimulating wavelengths less than 250 nm by ionization of electrons from F- and $F^+$-centers. This causes a background signal that is not related to the radiation dose that has to be measured and should be avoided.

Whereas the present invention has been described in relation to the drawings attached hereto, it should be understood that other and further modifications, apart from those shown or suggested herein, may be made within the spirit and scope of this invention without constituting a separate invention.

Bibliography

References (1) S. W. S. McKeever, M. Moscovitch and P. D. Townsend, Thermoluminescence Dosimetry Materials: Properties and Usage, Nuclear Technology Publishing, Ashford (1996).

(2) V. V. Antonov-Romanovskii, I. F. Keirum-Marcus, M. S. Poroshina, and Z. A. Trapeznikova, in Conference of the Academy of Sciences Session of the Division of Physical and Mathematical Sciences, *USAEC Report* AEC-tr-2435 (Pt. 1), pp. 239–250 (1956).

(3) P. Bräunlich, D. Schäfer and A. Scharmann, A Simple Model for Thermoluminescence and Thermally Stimulated Conductivity of Inorganic Photoconducting Phosphors and Experiments Pertaining to Infrared-Stimulated Luminescence, *Proc. 1st Int. Conf. Luminescence Dosimetry*, Stanford, June 1965, USAEC, pp. 57–73 (1967).

(4) E. N. Sanborn and E. L. Beard, Sulfides of Strontium, Calcium, and Magnesium in Infrared-Stimulated Luminescence Dosimetry, *Proc. 1st Int. Conf. Luminescence Dosimetry*, Stanford, June 1965, USAEC, pp. 183–191 (1967).

(5) R. P. Rao, M. de Murcia and J. Gasiot, Optically Stimulated Luminescence Dosimetry, *Radiation Protection Dosimetry*, vol. 6, pp. 64–66 (1984).

(6) C. R. Rhyner and W. G. Miller, Radiation Dosimetry by Optically Stimulated Luminescence of BeO, *Health Physics*, vol. 18, pp. 681–684 (1970).

(7) R. Bernhardt and L. Herforth, Radiation Dosimetry by Optically Stimulated Phosphorescence of $CaF_2$:Mn, *Proc. 4th International Conference on Luminescence Dosimetry*, Krakow, Poland (1974).

(8) J. Henniger, B. Horlbeck, K. Hübner and K. Prokert, The Evaluation of $CaF_2$:Mn-Polyethylene Detectors with the Aid of the Optically Stimulated Luminescence (OSL), *Nuclear Instruments and Methods*, vol. 204, pp. 209–212 (1982).

(9) A. S. Pradhan and K. Ayyangar, Radiation Dosimetry by Photostimulated Luminescence of $CaSO_4$:Dy, *Journal of Applied Radiation and Isotopes* vol. 28, pp. 534–535 (1977).

(10) A. S. Pradhan and R. C. Bhatt Photo-Stimulated Luminescence and Thermoluminescence in $CaSO_4$:Dy, *Physica Status Solidi (a)* vol. 68, pp. 405–411 (1981).

(11) A. S. Pradhan, B. Chandra and R. C. Bhatt, Phosphorescence and Photostimulated Luminescence of $CaSO_4$:Dy Embedded in Polyethylene Discs at Elevated Temperature for Fast Neutron Dosimetry, *Radiation Protection Dosimety*, vol. 5, pp. 159–162 (1984).

(12) S. D. Miller, G. W. R. Endres, J. C. MacDonald and K. L. Swinth, Cooled Optically Stimulated Luminescence in $CaF_2$:Mn, *Radiation Protection Dosimetry*, vol. 25, pp. 201–205 (1988).

(13) V. K. Jain, Photostimulated Thermoluminescence, in Thermoluminecence and Thermoluminescent Dosimetry, editor Y. S. Horowitz, *CRC Press*, Boca Raton, vol. II, pp. 173 (1984).

(14) J. Gasiot, P. F. Bräunlich and J. P. Fillard, Methods for Rapidly Stimulating Luminescent Phosphors and Recovering Information Therefrom U.S. Pat. No. 4,507,562 (1985).

(15) S. D. Miller, J. C. MacDonald, F. N. Eichner and P. L. Tomeraasen, System for Use with Solid State Dosimeters, U.S. Pat. No. 4,954,707 (1990).

(16) S. D. Miller, J. C. MacDonald, F. N. Eichner and J. S. Durham, Method for Detecting Radiation Dose Utilizing Thermoluminescence Material, U.S. Pat. No. 5,136,163 (1992).

(17) D. J. Huntley, D. L. Godfrey-Smith and M. L. W. Thewalt, Optical Dating of Sediments, *Nature*, vol. 313, pp. 105–107 (1985).

(18) E. Piesch, B. Burgkhardt, M. Fischer, H. G. Rober and S. Ugi, Properties of Radiophotoluminescence Glass Dosemeter Systems Using Pulsed Laser UV Excitation, Radiation Protection Dosimetry, vol. 17, pp. 293–297 (1986).

(19) E. Piesch, B. Burgkhardt and M. Vilgis, Photoluminescence Dosimetry—Progress and Present State of the Art, Radiation Protection Dosimetry, vol. 33, pp. 215–226 (1990).

(20) B. Burgkhardt, M. Vilgis, E. Piesch, T. Ishidoya and T. Ikegami, Modern Automatic Readout System for Phosphate Glass Dosemeters Using UV Laser Excitation, Radiation Protection Dosimetry, vol. 34, pp. 369–372 (1990).

(21) E. Piesch, B. Burgkhardt and M. Vilgis, Progress in Phosphate Glass Dosimetry: Experiences and Routine Monitoring with a Modern Dosimetry System, Radiation Protection Dosimetry, vol. 47, pp. 409–414 (1993).

(22) D. F. Regulla, Lithium Fluoride Dosimetry Based on Radiophotoluminescence, Health Physics, vol. 22, pp. 491–421 (1975).

(23) S. D. Miller, Method for Radiation Detection and Measurement, U.S. Pat. No. 5,272,348.

(24) S. D. Miller, Method for Increased Sensitivity of Radiation Detection and Measurement, U.S. Pat. No. 5,354,997 (1994).

(25) J. Gasiot, P. Bräunlich and J. P. Fillard, Laser Heating in Thermoluminecence Dosimetry, Journal of Applied Physics, vol. 53, pp. 5200–5209 (1982).

(26) P. F. Bräunlich and W. Tetzlaff, Method and Apparatus for Reading Thermoluminescence Phosphors, U.S. Pat. No. 4,638,163 (1987).

(27) P. F. Bräunlich and W. Tetzlaff, Apparatuses and Methods for Laser Reading of Thermoluminescence Phosphors, U.S. Pat. No. 4,839,518 (1989).

(28) P. F. Bräunlich and W. Tetzlaff, Apparatuses and Methods for Laser Reading of Phosphors, U.S. Pat. No. 4,906,848 (1990).

(29) P. F. Bräunlich, W. Tetzlaff, J. E. Hegland and S. C. Jones, Remote Radiation Dosimetry, 4,999,504 (1991).

(30) W. Tetzlaff, J. W. Hoescher, P. F. Bräunlich and C. D. Bloomsburg, Dosimeter Reading Apparatus with Optical Laser Converter, U.S. Pat. No. 5,401,734 (1991).

What is claimed is:

1. A method for fast determination of an unknown absorbed dose of radiation using optically stimulated luminescence from a suitable luminescent material having luminescence centers comprising the steps of:

(a) mounting an irradiated sample of said luminescent material in the path of one or more illumination beams;

(b) simulating luminescence from said irradiated sample using a continuous stream of pulses from said illumination beam(s);

(c) after a delay between the end of each said pulse and the start of measurement, measuring and integrating the optically stimulated luminescence generated from said luminescent material within single gate periods between each successive pulse, the width of each said pulse, the period of delay between the end of each said pulse and the start of the gate, the width of the gate, and the time between successive pulses all being less than the prompt luminescence lifetime of said luminescence centers; and (d) comparing the integrated luminescence from said irradiated sample with calibrated integrated luminescence values attributable to known doses of irradiation in order to determine said unknown absorbed dose.

2. A method for fast determination of an unknown absorbed dose of radiation using optically stimulated luminescence from a suitable luminescent material comprising the steps of:

(a) mounting an irradiated sample of said luminescent material in the path of one or more illumination beams, said sample having a plurality of luminescence centers consisting essentially of lattice defects and impurities (acting as dosimetric traps) and having a radiation-induced absorption within the optical range of stimulation of said dosimetric traps;

(b) pulsing said illumination beam(s) for a period of time (an illumination pulse width) that is smaller than the lifetime of said luminescence centers, the photon flux density of said illumination beam (i) being smaller than the threshold for two-photon absorption which can lead to background luminescence from an unirradiated sample, (ii) being unable to heat said luminescent material to a temperature above the thermal quenching of said luminescence centers, (iii) being unable to heat said sample above the temperature of its thermoluminescence peak, and (iv) being unable to damage (or "blind") a photodetector; the wavelength of said illumination beam(s) being approximately equal to the wavelength of the maximum of the radiation-induced absorption band(s) of said luminescent material;

(c) obtaining a luminescence signal by detecting the radiation-induced luminescence light emitted from said luminescent material with a photodetector after a time delay following the laser pulse sufficient to allow said photodetector to relax; said luminescence light being emitted at a wavelength different from the wavelength of said illumination beam(s);

(d) gating either said photodetector or associated data acquisition electronics off for a period of time which is smaller than the lifetime of said luminescence centers but longer than said illumination pulse width and encompassing said illumination pulse width;

(e) in a first mode choosing the number of illumination pulses, each being followed by said time delay and by periods during which said luminescence light is detected, and choosing a total illumination light energy to extract completely, or almost completely, the radiation-induced luminescence from the sample; or alternatively (f) in a second mode choosing the number of said illumination pulses, each followed by said time delay and by periods during which said luminescence light is detected, sufficient to extract only a portion of the radiation-induced luminescence from the sample, the amount of energy of said illumination beam being precisely delivered and measured in order to allow for the performance of a second or more measurements on said sample after the same irradiation for the purpose of absorbed dose re-estimation; and (g) in either of said modes, comparing said luminescence signal with calibrated luminescence signals attributable to known doses of irradiation in order to determine said unknown dose of said irradiation.

3. The method according to claim 2 further comprising adjusting the intensity of said illumination beam appropriate to the dose range being studied in order to achieve a dynamic range of measurement of the absorbed dose of several orders of magnitude.

4. The method according to claim 2 wherein step (b) further comprises sequentially pulsing two or more of said illumination beams in order to stimulate two or more of said dosimetric traps having different optical depths in said luminescent material for the purpose of absorbed dose re-estimation, said beams having different wavelengths.

5. The method according to claim 2 wherein said luminescent material is a material consisting of three or more chemical elements in solid solution and wherein said radiation-induced absorption bands in the wavelength region of said illumination beam(s) and said luminescence is optically stimulated in proportion to the absorbed dose.

6. The method according to claim 2 further comprising re-estimating said absorbed dose of radiation one or more times by using experimentally determined correction factors to correct said luminescence light for the number of times the dose re-estimation was previously performed from the same said photodetector and for the same irradiation.

7. The method according to claim 2 further comprising filtering said illumination beam(s) so that light from said illumination beam(s) is isolated from said photodetector while said luminescence light emitted from luminescent material is passed to said photodetector.

8. The method according to claim 2, further comprising:
   (a) pulsing two or more illumination beams having the same wavelength of stimulation but different energy per pulse to perform said absorbed dose measurements over a wide dynamic range, each of said illumination beams being used to perform measurements in a designated absorbed dose range;
   (b) performing a first measurement with the weakest of said illumination beams to approximately determine the absorbed dose or dose range of measurement; and
   (c) performing a second precise measurement along pre-defined calibration parameters using either the stronger or the weaker of said illumination beams.

9. The method according to claim 8 wherein said energy per pulse of said weakest of said illumination beams is at least 10 times smaller than that of said stronger of said illumination beams.

10. The method of claim 8 further comprising controlling the number of said pulses of illumination by means of an electronic shutter, mechanical shutter, beam polarizer or liquid crystal modulator.

11. The method according to claim 5 wherein (a) said luminescent material is crystalline anion-deficient aluminum oxide with a third element, or elements in solid solution, with an F-center concentration of $10^{16}-10^{18}$ cm$^{-3}$, corresponding to an absorption coefficient of $1-100$ cm$^{-1}$ at 205 nm, and an F$^+$-center concentration of $10^{15}-10^{17}$ cm$^{-3}$, corresponding to an absorption coefficient of $0.1-10$ cm$^{-1}$ at 225 nm, and with luminescence lifetime at room temperature of $35\pm5$ ms; and (b) said illumination beam(s) have wavelengths in the range of 250–1100 nm.

12. The method according to claim 11 further comprising producing said illumination beam(s) with a Nd:YAG laser with second harmonic generation at 532 nm and with pulse durations of 1–10,000 ns, and repetition rates of 1–20,000 Hz.

13. A system for fast determination of an unknown absorbed dose of radiation using optically stimulated luminescence from a suitable luminescent material having luminescence centers comprising:
   (a) an illuminating light for generating one or more illumination beams;
   (b) a sample chamber for holding an irradiated sample of said luminescent material in the path of said illumination beams;
   (c) a photodetector (light detector) and data acquisition electronics for measuring the integrated optically stimulated luminescence generated from said luminescent material between successive pulses of said illumination beams after a delay between the end of the pulse and the start of measurement;
   (d) a pulse generator and controller for synchronizing the illuminations pulses and light detection/data acquisition electronics in such a way that said optically stimulated luminescence is measured between pulses of said illumination beams and after said delay between the end of the pulses and the start of measurement;
   (e) optical filters to help isolate said photodector from said illumination pulses while transmitting luminescence light;
   (f) electronic shutters, mirrors, beam splitters and beam expanders for creating and controlling two or more illumination beams; and
   (g) a power/energy meter measuring the power/energy of said illumination beam(s).

* * * * *